(12) United States Patent
Ferreira da Silva

(10) Patent No.: US 10,354,241 B2
(45) Date of Patent: Jul. 16, 2019

(54) STORING TRANSACTION DETAILS FOR MOBILE TELEPHONE TOP UPS VIA AUTOMATIC TELLER MACHINES

(71) Applicant: Mastercard International Incorporated, Purchase, NY (US)

(72) Inventor: Luis Filipe de Almeida Ferreira da Silva, Brussels (BE)

(73) Assignee: Mastercard International Incorporated, Purchase, NY (US)

( * ) Notice: Subject to any disclaimer, the term of this patent is extended or adjusted under 35 U.S.C. 154(b) by 764 days.

(21) Appl. No.: 15/004,164

(22) Filed: Jan. 22, 2016

(65) Prior Publication Data

US 2016/0140525 A1    May 19, 2016

Related U.S. Application Data

(63) Continuation of application No. 12/435,010, filed on May 4, 2009, now abandoned.

(51) Int. Cl.
| | |
|---|---|
| *G06Q 20/10* | (2012.01) |
| *G06Q 20/32* | (2012.01) |
| *G06Q 20/40* | (2012.01) |
| *G06Q 20/42* | (2012.01) |
| *G06Q 40/00* | (2012.01) |
| *G07F 19/00* | (2006.01) |

(52) U.S. Cl.
CPC ....... *G06Q 20/1085* (2013.01); *G06Q 20/102* (2013.01); *G06Q 20/325* (2013.01); *G06Q 20/401* (2013.01); *G06Q 20/42* (2013.01); *G06Q 40/00* (2013.01); *G06Q 40/12* (2013.12); *G07F 19/20* (2013.01); *G07F 19/204* (2013.01)

(58) Field of Classification Search
None
See application file for complete search history.

(56) References Cited

U.S. PATENT DOCUMENTS

| | | | | |
|---|---|---|---|---|
| 7,021,530 B2* | 4/2006 | Hoch | ..................... | G06Q 20/04 235/379 |
| 7,783,570 B2* | 8/2010 | Nicoll | .................. | G06Q 20/042 235/379 |
| 2005/0177510 A1* | 8/2005 | Hilt | ........................ | G06Q 20/04 705/40 |
| 2006/0136334 A1* | 6/2006 | Atkinson | ............. | G06Q 10/087 705/40 |
| 2009/0018958 A1* | 1/2009 | Aveyard | .................. | G06F 9/541 705/43 |

* cited by examiner

*Primary Examiner* — Allen C Chein
(74) *Attorney, Agent, or Firm* — Buckley, Maschoff & Talwalkar LLC

(57) ABSTRACT

Methods and apparatus for operating an automatic teller machine (ATM) to perform a mobile telephone top up. In an embodiment, a card reader associated with an ATM processor reads a card account number and receives, via an input device, an indication from the cardholder to perform a mobile telephone top up transaction. The ATM processor then transmits a request for prior top up transaction data to a service provider computer, receives the requested data, displays it on a display screen, receives a selection by the cardholder of a mobile telephone carrier and a mobile telephone number, and receives an amount of money indication to apply. The ATM processor then transmits a second request to the service provider including the amount of money indication and the selection from the displayed prior top up transaction data.

6 Claims, 16 Drawing Sheets

STORING TRANSACTION DETAILS FOR MOBILE TELEPHONE TOP UPS VIA AUTOMATIC TELLER MACHINES

CROSS-REFERENCE TO RELATED APPLICATION

This continuation application claims priority to U.S. patent application Ser. No. 12/435,010, filed on May 4, 2009, which is hereby incorporated by reference in its entirety.

BACKGROUND

Mobile telephone service is typically purchased either via a monthly payment plan or on a pre-paid basis. In the latter case, customers periodically engage in "top up" transactions from time to time in order to pre-pay for additional "air time".

In some cases mobile telephone customers are permitted to perform top up transactions via automatic teller machines (ATMs). For example, the customer may insert his/her payment card (i.e., credit or debit card) into the ATM in order to charge the top up to his credit/debit card account.

The present inventor has now recognized that there are opportunities for enhancing the convenience of mobile telephone top up transactions undertaken via ATMs.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a service provider keeps a computerized record of mobile top up transaction details (e.g., identity of mobile carrier plus mobile telephone number) for top up transactions performed via ATMs by payment card holders. When a card holder initiates a new top up transaction at an ATM, communications are exchanged between the ATM and the service provider so as to download to the ATM details from previous ATM-based top up transactions by the card holder. This may facilitate the card holder's selection/input of transaction details for the current transaction.

Figure 1:
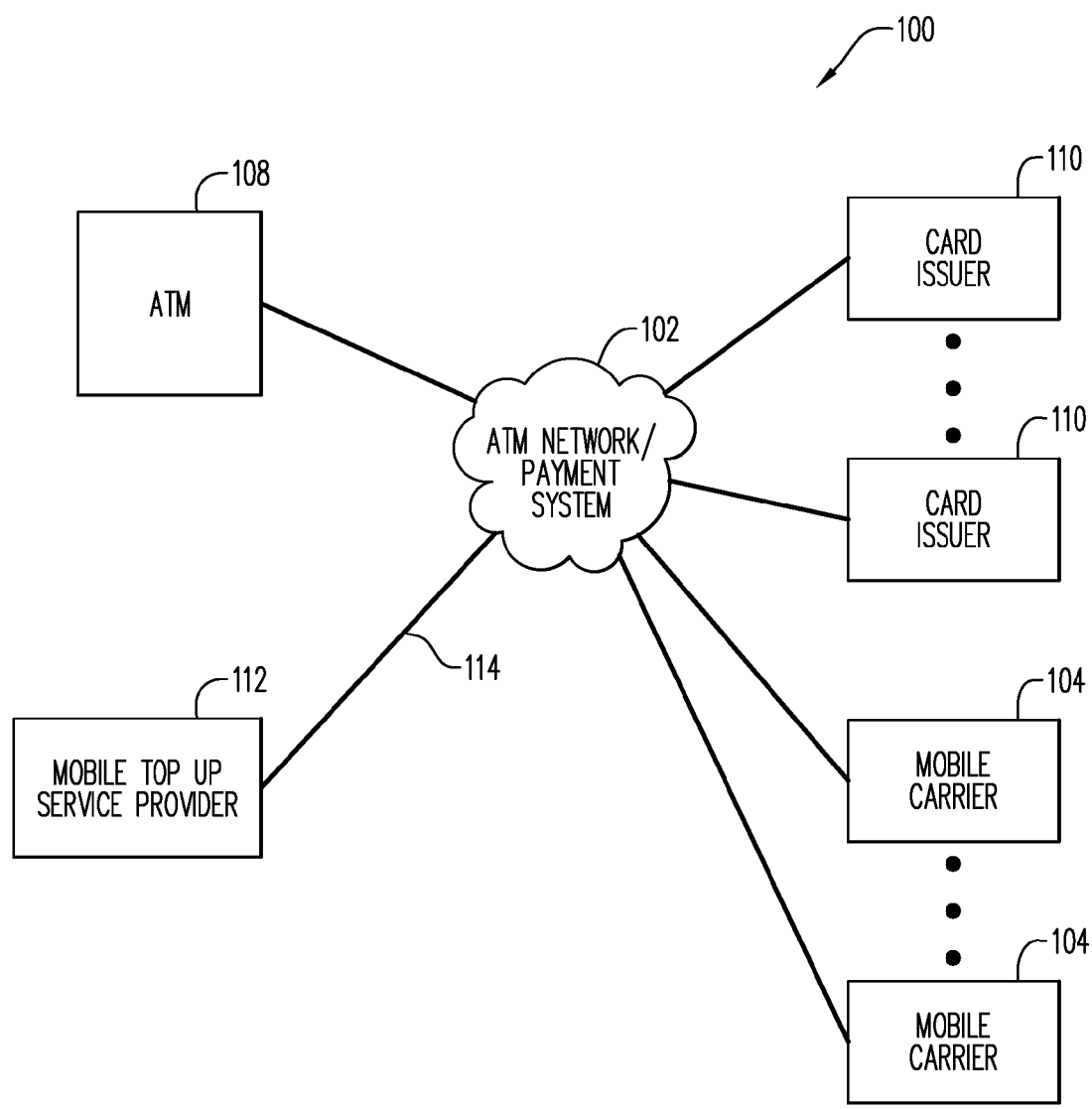
FIG. 1 is a block diagram that illustrates an embodiment of a mobile telephone top up transaction system provided according to some aspects of the present invention.

FIG. 1 is a block diagram that illustrates an embodiment of a mobile telephone top up transaction system 100 provided according to some aspects of the present invention.

The mobile telephone top up transaction system 100 includes a conventional payment system/ATM network 102 that may include conventional computing and telecommunication resources to link the ATMs (of which one is shown, indicated by reference numeral 108) with numerous card issuers 110 which issue ATM and/or payment cards. In accordance with conventional practices, the holders (not shown) of the ATM cards and/or payment cards may use the ATM cards and/or payment cards to perform cash withdrawals and other transactions such as mobile top up transactions via the ATMs. The ATMs may in some cases be operated by the card issuers 110 and may be located at the premises of the card issuers or at other locations such as retail stores. In some cases the ATMs may be operated by businesses that are not financial institutions. The ATM 108 may fall into any of the categories of ATMs enumerated in the previous two sentences.

As will be understood by those who are skilled in the art, the payment system/ATM network 102 also includes acquiring institutions ("acquirers"; not separately shown) which are typically financial institutions that have relationships with the ATM operators or operate the ATMs themselves and that initiate ATM transactions in response to communications from ATM operators and/or the ATMs they themselves operate (and/or from payment card transaction processors). The payment system/ATM network 102 also includes payment card issuing institutions ("issuers") 110 that issue ATM cards (typically credit cards and/or debit cards) to individual consumers, businesses and other entities. A major component (also not separately shown) of the payment system/ATM network 102 is a transaction routing and clearing system, which routes ATM transactions from acquirers to issuers. One very well known and extensively used transaction routing and clearing system is called "Banknet" and is operated by MasterCard International Inc., the assignee hereof.

The mobile telephone top up transaction system 100 also includes a number of mobile telephone carriers 104 (also known as "mobile network operators" or "MNOs"). The mobile telephone carriers 104 operate mobile telephone service networks serving numerous mobile telephone service subscribers (not shown). The mobile telephone carriers 104 receive payments for mobile telephone top up transactions via the payment system 102/ATM network (i.e., via acquirers that have banking relationships with the mobile telephone carriers 104—these acquirers are not shown), and in response to these payments, the mobile telephone carriers 104 increase the currently available amounts of air time for the subscribers who made the payments. Examples of how the payments may be made in the mobile telephone top up transaction system 100 will be provided below.

Still further, the mobile telephone top up transaction system 100 includes a mobile top up service provider computer 112, which may be connected by suitable data communication links 114 to the payment system/ATM network 102. The mobile top up service provider computer 112 is provided in accordance with aspects of the present invention. As will be seen from subsequent discussion, the mobile top up service provider computer 112 handles and facilitates mobile top up transactions initiated by users (mobile telephone subscribers) via the ATM 108 (and/or via other ATMs connected to the ATM network 106). The mobile top up service provider computer 112 may be operated by or on behalf of the operator (which could be a payment card association) of the payment system/ATM network 102. Alternatively, the mobile top up service provider computer 112 may also be provided by or on behalf of other participants in the system, such as one or more of the card issuers 110, the operator of the ATM 108, one or more acquirers (not shown), or any other independent provider.

Figure 2:
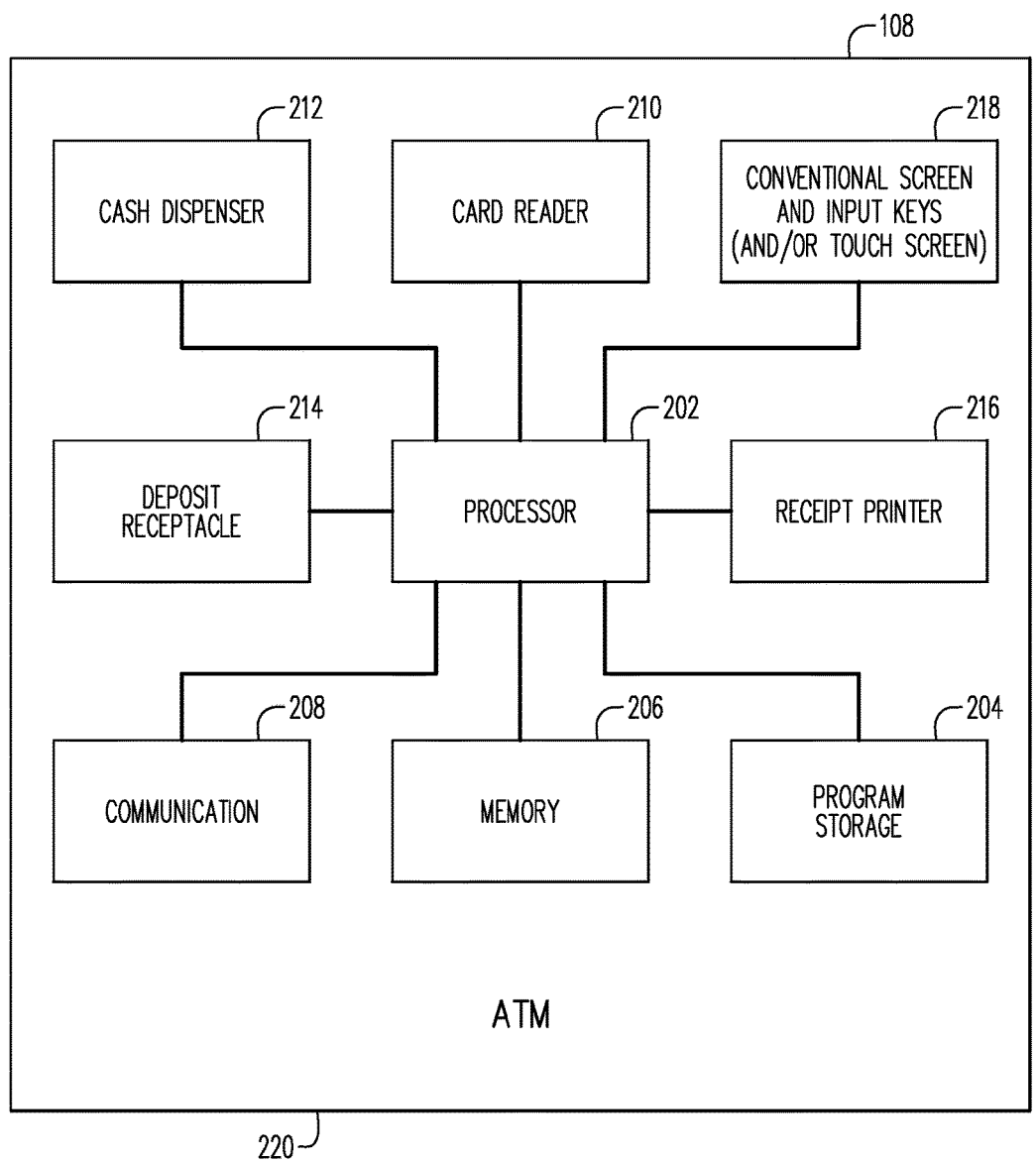
FIG. 2 is a block diagram that illustrates a typical ATM that may be part of the system of FIG. 1.

FIG. 2 is a block diagram that illustrates an embodiment of the ATM 108 shown in FIG. 1. ATM 108 may be entirely conventional in its hardware aspects, but may be programmed in accordance with aspects of the invention to provide novel features and functionality as described below.

Inasmuch as the hardware constituting ATM 108 may be conventional, that hardware will now be described only in a summary fashion. The ATM 108 includes, and is controlled in its operation by, a conventional processor 202, which may be a microprocessor. The ATM 108 also includes one or more program storage devices 204 (e.g, memory device(s), mass storage, computer-readable media, or the like) which store program instructions that are executed by and control the processor 202. The program instructions are such that the ATM 108 performs processes as described below. The program storage device is in communication with the processor 202.

Further, the ATM 108 includes working memory 206 (RAM and/or flash memory, etc.), also in communication with the processor 202. Also included in the ATM 108 is a communication device 208, coupled to the processor 202. The ATM 108 is able to exchange data communications via the communication device 208 with other devices, such as the ATM network 106 (FIG. 1) or the mobile top up service provider computer 112 (either via the ATM network 106 or directly).

Also, the ATM 108 includes a conventional card reader 210. The card reader 210 is in communication with the processor 202 and functions to read information from magnetic stripes and/or integrated circuit cards (ICC) on ATM cards and/or payment cards inserted into the card reader 210 by users of the ATM 108.

Still further, the ATM 108 includes a conventional cash dispenser 212. The cash dispenser 212 is coupled to and under the control of the processor 202, and operates in a conventional manner to dispense cash in response to requests entered by users into the ATM 108.

The ATM 108 also includes a conventional deposit envelope receptacle 214 which operates to receive deposit envelopes inserted by users into the ATM 108. Also included in the ATM 108 is a conventional receipt printer 216. The receipt printer 216 is coupled to the processor 202 and is controlled in a conventional manner by the processor 202 to print and dispense transaction receipts for users of the ATM 108.

Moreover, the ATM 108 includes a conventional screen and input keys (or a touch screen) 218. The screen and input keys (or a touch screen) 218 are in communication with the processor 202 and constitutes the primary data input/output component for the ATM 108. In other words, the screen and input keys (or a touch screen) 218 are the primary mechanism by which the ATM 108 provides a user interface, and are the main component by which the user communicates with the processor 202 and hence with the ATM 108.

All of the above-enumerated components of the ATM 108 are contained in and/or supported by a housing which is schematically indicated at 220.

Figure 3:
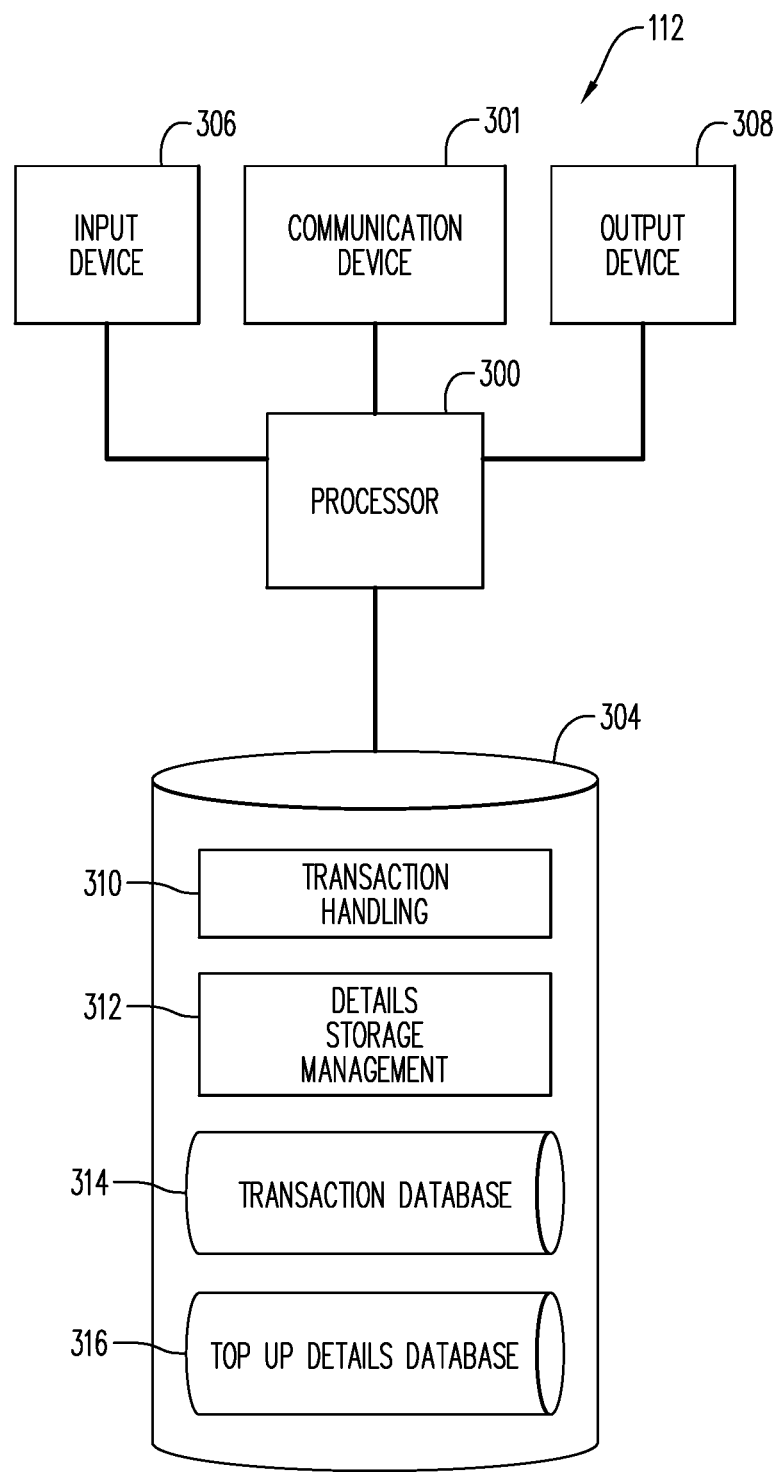
FIG. 3 is a block diagram that illustrates an embodiment of a computer that may be operated by a top up transaction service provider as part of the system of FIG. 1.

FIG. 3 is a block diagram that illustrates an embodiment of the mobile top up service provider computer 112.

The mobile top up service provider computer 112 may be conventional in its hardware aspects but may be controlled by software to cause it to operate in accordance with aspects of the present invention.

The mobile top up service provider computer 112 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the mobile top up service provider computer 112 to provide desired functionality.

Communication device 301 may be used to facilitate communication with, for example, other devices (such as the ATM 108 and the payment system 102).

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium.

Storage device 304 stores one or more programs for controlling processor 300. The programs comprise program instructions that contain processor-executable process steps of mobile top up service provider computer 112, including process steps that constitute processes provided in accordance with principles of the present invention, as described in more detail below.

The programs may include an application/program module 310 that controls the processor 300 to handle mobile telephone top up transactions initiated by users of ATM 108 and other ATMs interfaced to the payment system/ATM network 102. Details of processes implemented by the application/program module 310 will be described below in conjunction with FIGS. 12A and 12B.

The programs may also include an application/program module 312 by which the mobile top up service provider computer 112 manages storage of top up transaction "details" by which is meant the mobile carrier and mobile telephone number with respect to which a particular top up transaction is carried out.

In addition to the software programs expressly listed above, the mobile top up service provider computer 112 may be programmed with other software, such as one or more operating systems, device drivers, database management programs, programs to enable the mobile top up service provider computer 112 to operate as a server computer with respect to remote client applications, communication software, etc.

The storage device 304 may also store a database 314 which contains data regarding top up transactions handled by the mobile top up service provider computer 112, and a database 316 which stores the "details" (carrier and mobile phone number) for subscribers' past top up transactions. Practices for generating and maintaining the details database 316, in accordance with aspects of the present invention, will be described below.

Figure 4A:
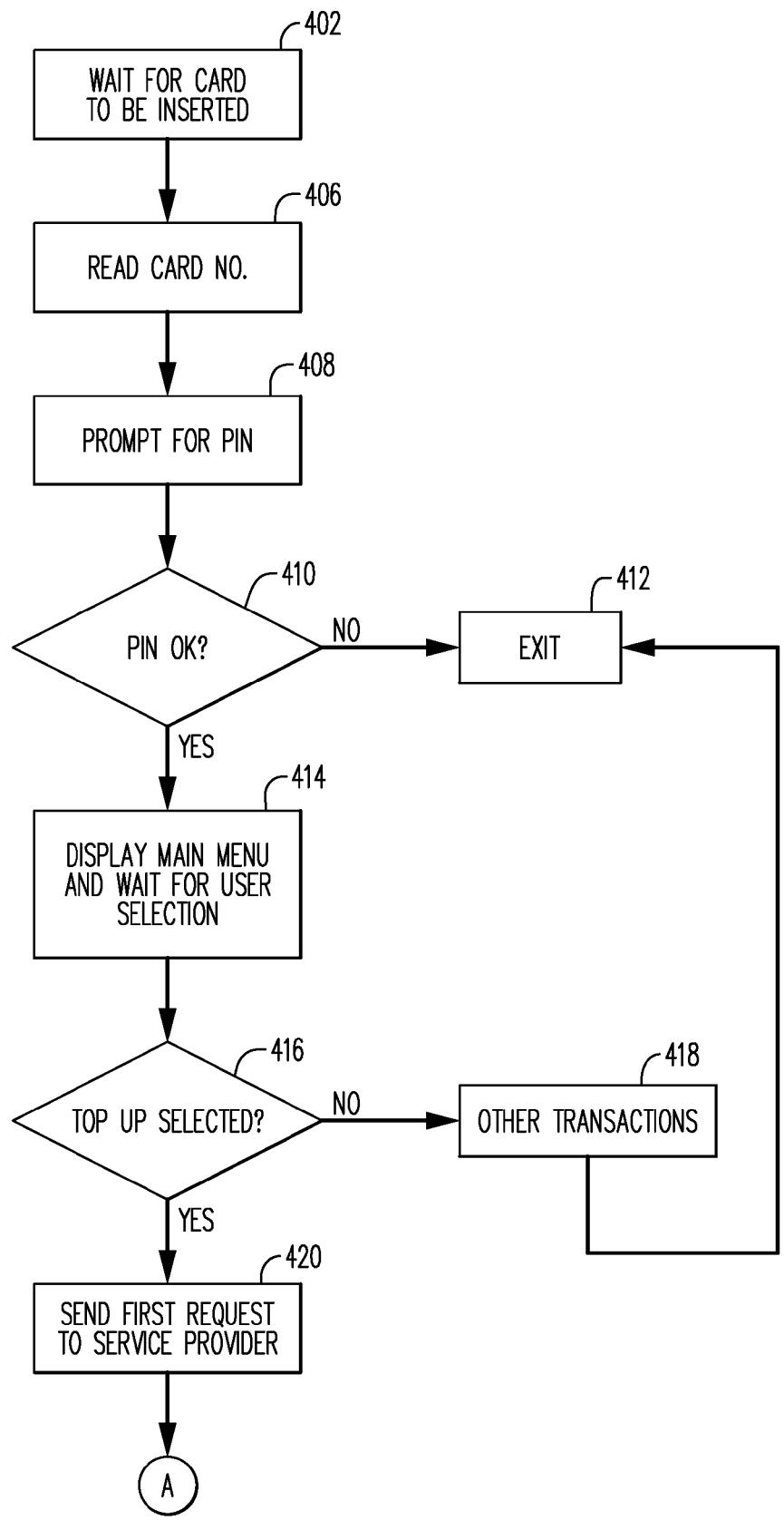
FIGS. 4A-4C together form a flow chart that illustrates an example top up transaction process as performed in accordance with aspects of the present invention in the ATM of FIG. 2.
Figure 4B:
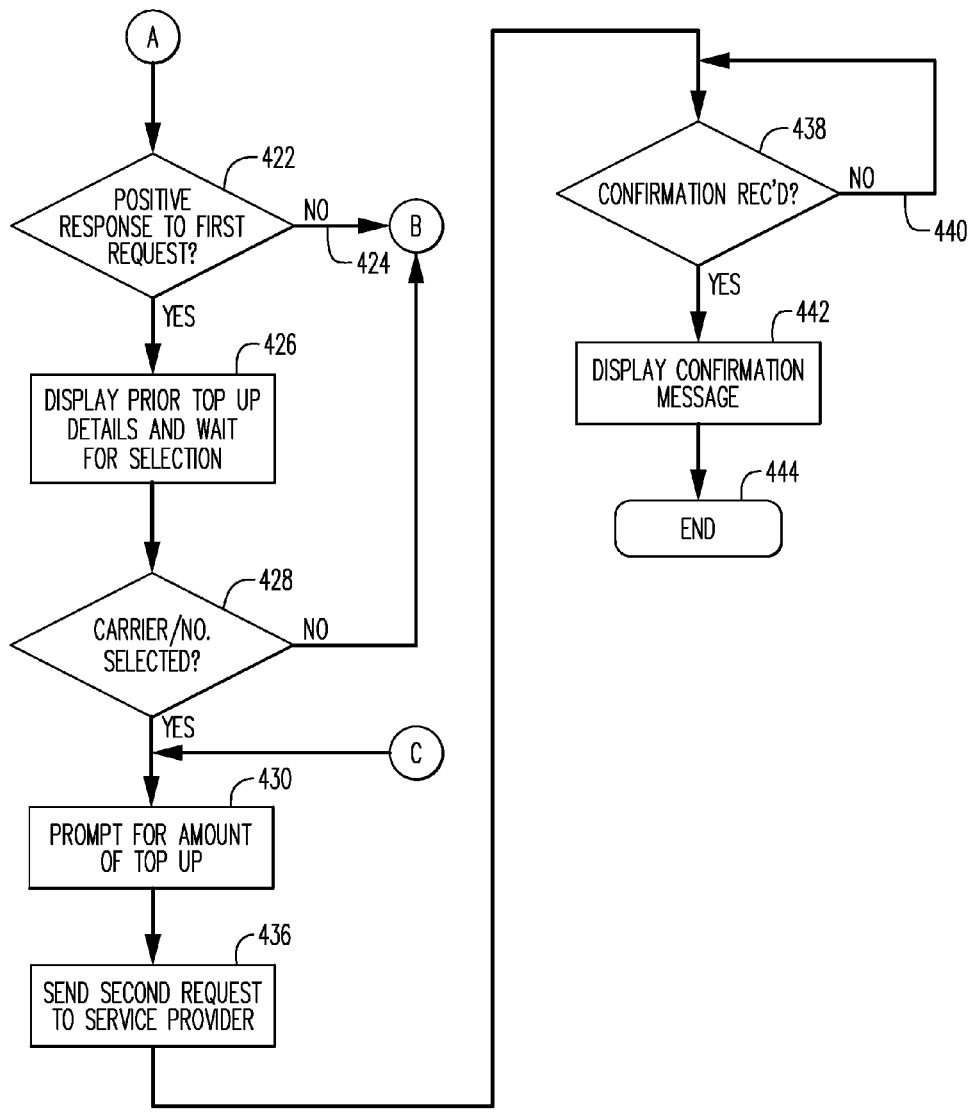
Figure 4C:
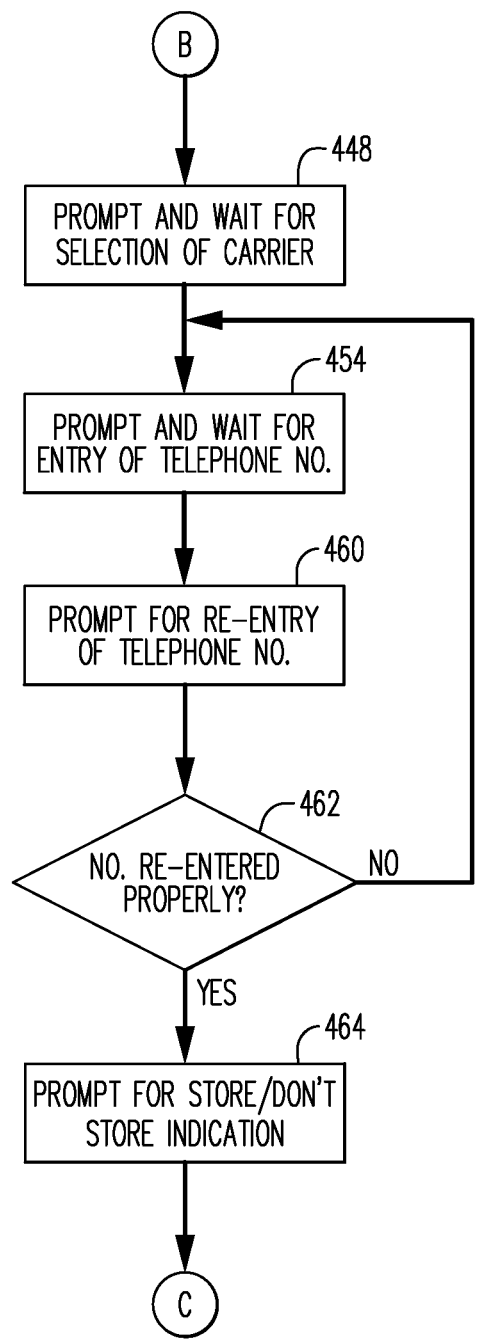

FIGS. 4A-4C together form a flow chart that illustrates an example top up transaction process as performed in accordance with aspects of the present invention in the ATM 108.

At block 402 in FIG. 4A, the ATM 108 idles until a user has inserted a magnetic stripe (and/or ICC) card into the card reader 210 of the ATM 108.

When it is the case that a magnetic stripe (and/or ICC) card has been inserted into the card reader 210, then the process advances from block 402 to block 406. At block 406, the card reader 210 reads the card number (and possibly other information as well) from the magnetic stripe (and/or ICC) on the card and transmits the card number to the processor 202. It will be appreciated that the magnetic stripe (and/or ICC) card may be an ATM card or a payment card (credit card or debit card). The card number corresponds to the cardholder's payment or ATM card account number as used within the payment system/ATM network 102.

Following block 406 is block 408. At block 408, the ATM 108, via the touch screen 218, prompts the user to enter his/her PIN (personal identification number). This step may be implemented in a conventional fashion, using the screen and input keys (or a touch screen) 218 to display appropriate messages and allow the user to enter his or her PIN. The ATM 108 may check the validity of the entered PIN in a conventional fashion. After block 408, the process of FIGS. 4A-4C may branch at decision block 410 depending on whether the ATM 108 found the PIN to be valid. If the PIN was not valid, the process may end (412).

Figure 5:
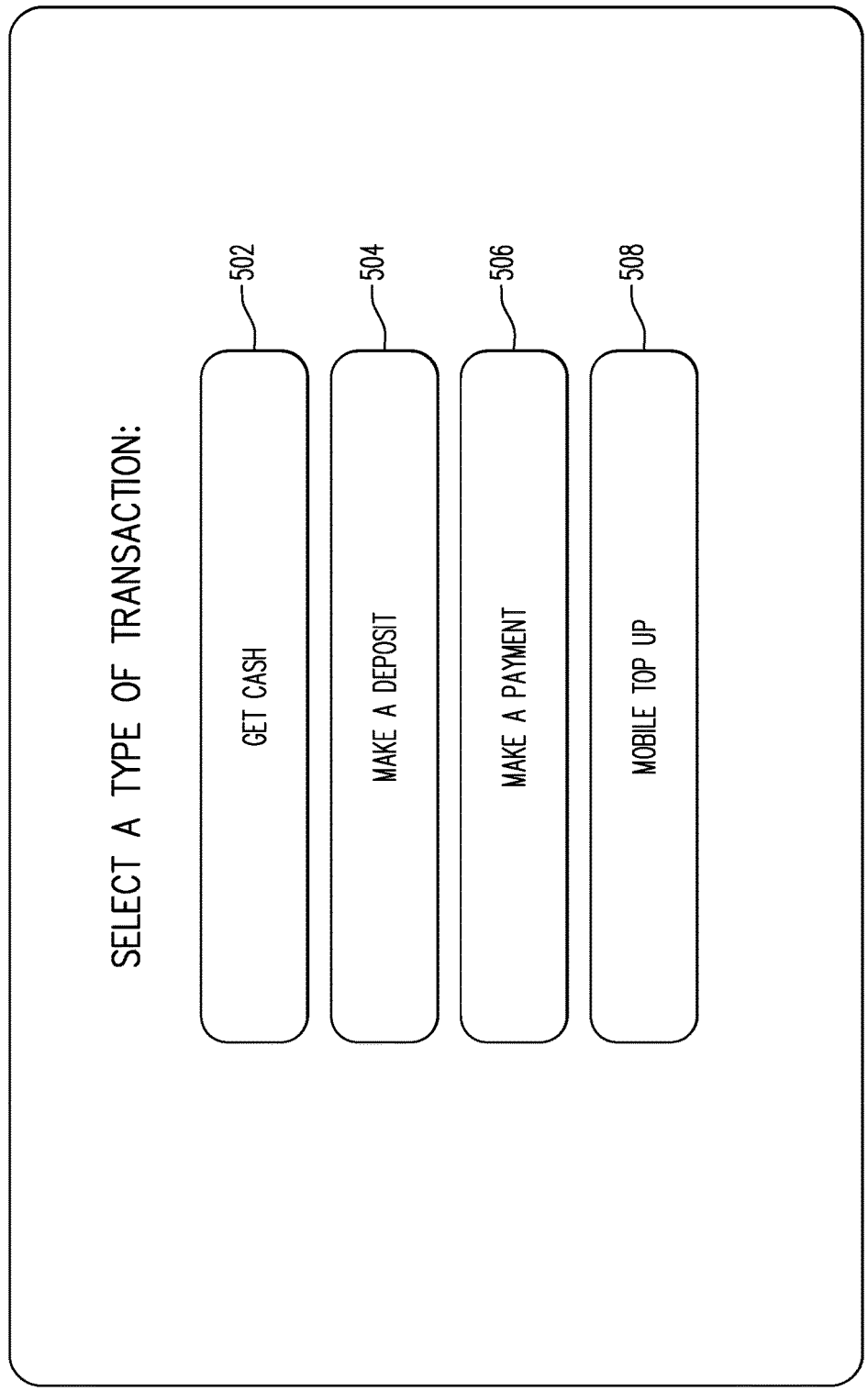
FIGS. 5-11 illustrate screen displays that may be presented to a user by the ATM of FIG. 2 in connection with the process of FIGS. 4A-4C.

However, if the PIN was valid, then the process may advance from decision block 410 to block 414. At block 414, the ATM 108 may display a main menu to the user, via screen and input keys (or touch screen) 218 and wait for the user selection. An example main menu screen display is illustrated in FIG. 5. It will be observed that the main menu screen display includes four options 502, 504, 506, 508. (In alternative embodiments, other or additional menu options may be provided besides those illustrated in FIG. 5.) The user may select option 502 to select a transaction in which the ATM 108 dispenses cash. The user may select option 504 to select a transaction in which the user submits a banking deposit to the ATM 108. The user may select option 506 to select a transaction in which the user operates the ATM 108 to make a payment. The user may select option 508 to select a mobile top up transaction. It is the latter type of transaction which is the primary subject of the ensuing discussion.

Referring again to FIG. 4A, decision block 416 follows block 414. At decision block 416, the ATM 108 determines whether the user has selected a mobile top up transaction from the main menu. If such is not the case, then the ATM 108 handles the selected transaction (block 418) in a conventional manner. However, if the user selects a mobile top up transaction, then the process advances from decision block 416 to block 420.

At block 420, the ATM 108 transmits to the mobile top up service provider computer 112 a request that indicates that the user wishes to perform a mobile top up transaction. The request may identify the user by his/her ATM card and/or payment card account number, as read from his/her card by the card reader 210 of the ATM 108. In effect, as will be seen, the request transmitted by the ATM 108 to the mobile top up service provider computer 112 at 420 is a request that the mobile top up service provider computer 112 download to the ATM 108 details (mobile carrier and mobile telephone number) for at least one prior top up transaction engaged in by the user on this or another ATM. The request may, for example, include a suitable code or flag to indicate that it is a request for prior top up transaction detail information. The request does not include information indicative of a carrier, a mobile telephone number or a transaction amount.

As seen from FIG. 4B (taken in conjunction with FIG. 4A) the process advances from block 420 to decision block 422 (FIG. 4B). At decision block 422, the ATM 108 determines whether it has received a positive response (one that includes the requested details for at least one past mobile top up transaction) from the mobile top up service provider computer 112 to the request sent at 420. If the ATM 108 determines that it has not received a positive response (i.e., if the ATM 108 received a response containing no details for past mobile top up transaction or received no response at all after having waited for a predefined amount of time—typically referred to as a "time-out"), the process advances, as indicated by branch 424, from decision block 422 to block 448 in FIG. 4C. However, if the ATM 108 determines that it has received a positive response to the request, then the process advances from decision block 422 to block 426.

Figure 6:
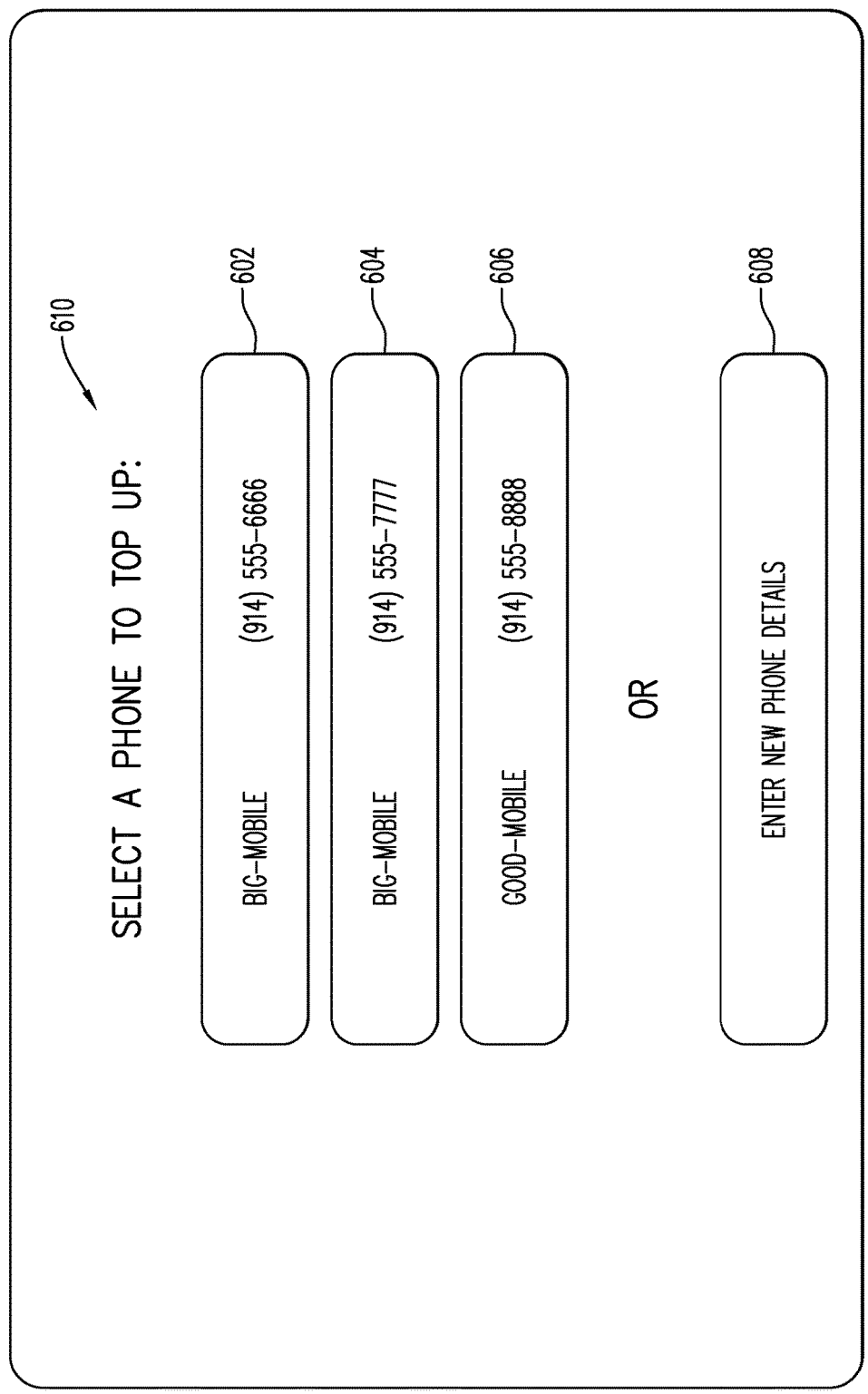

At 426, the ATM 108 may present to the user a screen display like that shown in FIG. 6. The screen display of FIG. 6 includes the options 602, 604, 606 and 608. Option 602 presents a first set of prior top up transaction details (mobile carrier name and mobile telephone number) downloaded from the mobile top up service provider computer 112 to the ATM 108 and reflecting a prior mobile top up transaction engaged in by the user. Option 604 presents a second set of prior top up transaction details downloaded from the mobile top up service provider computer 112 to the ATM 108 and reflecting another prior mobile top up transaction engaged in by the user. Option 606 presents a third set of prior top up transaction details downloaded from the mobile top up service provider computer 112 to the ATM 108 and reflecting still another prior mobile top up transaction engaged in by the user. In effect then, the options 602-606 provide the user with selection options corresponding to three different mobile telephones that the user may select among for topping up in the present transaction. These three options reflect information that may have been stored in the mobile telephone top up transaction system 100 (and specifically in the mobile top up service provider computer 112) in connection with prior top up transactions engaged in by the user. Consequently, the display of FIG. 6 and the data storage, management and communication that underlie the display of FIG. 6 may facilitate the user's operation of a top up transaction by relieving the user of the need to enter specific top up details (telephone number, mobile carrier) for the current top up transaction.

(The number of pre-stored detail options presented in the screen display may be more or less than the three options 602-606 shown in FIG. 6. The number of pre-stored detail options may depend, for example, on how many different mobile telephone accounts the user has previously topped up (and opted to have stored) via the mobile telephone top up transaction system 100. In some embodiments, the system may limit the number of different mobile telephone accounts for which details are stored for a given user. For example, the maximum number stored may be five or another maximum number.)

It will be observed that the screen display of FIG. 6 also includes option 608 by which the user may indicate that he/she wishes to enter a new set of mobile telephone account details. Also seen in FIG. 6 is a legend 610 which instructs the user to select one of the options 602-606 to select a phone for topping up.

Figure 7:
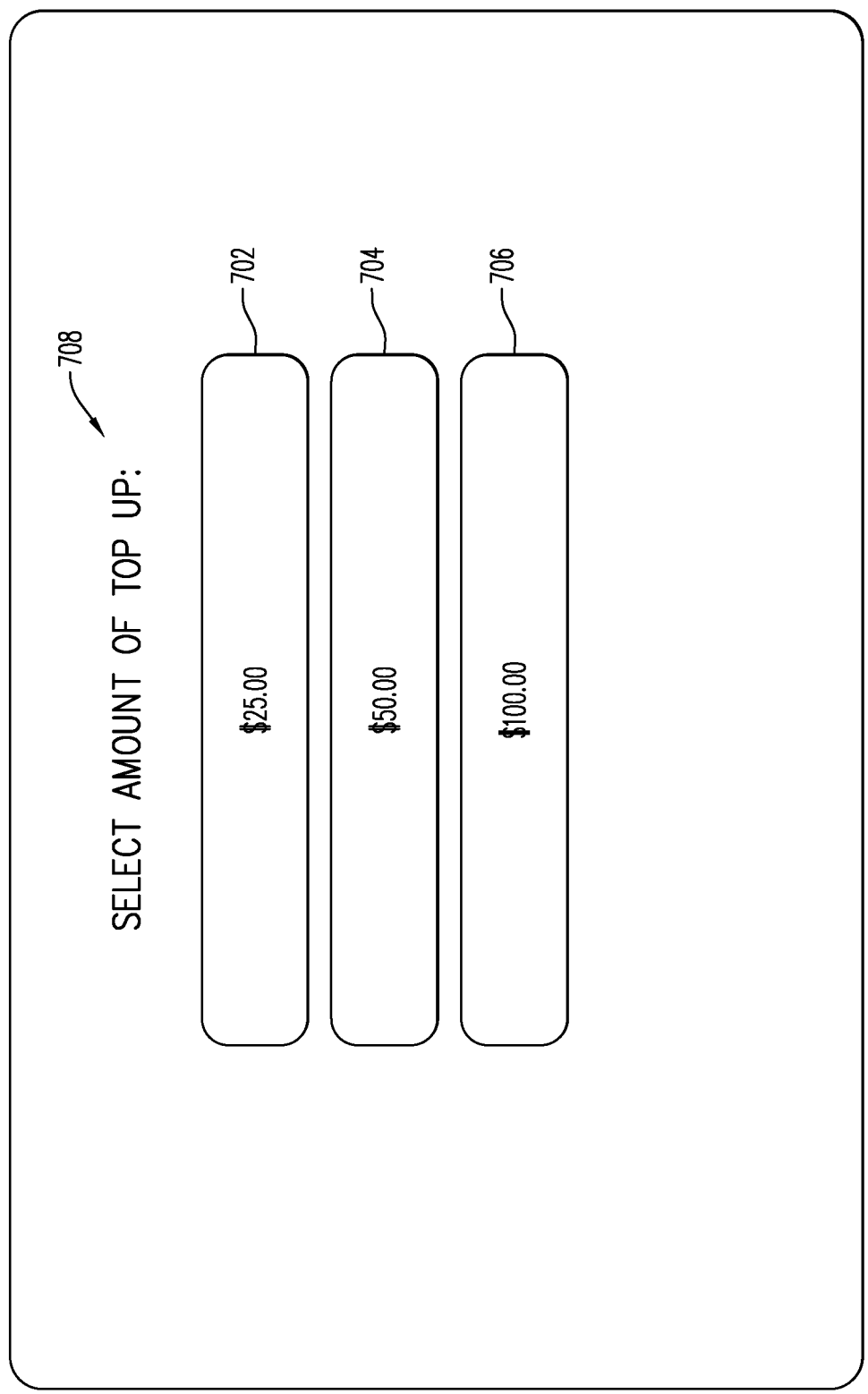

Referring again to FIG. 4B, the process advances from block 426 to decision block 428. At decision block 428, the ATM 108 determines whether the user has selected one of the options that represents stored (in the mobile top up service provider computer 112) details from a prior top up transaction. If so, the ATM 108 notes the corresponding selected details and advances to block 430 from decision block 428. At block 430, the ATM 108 prompts the user to select an amount of money for the desired top up and waits until the user indicates his/her choice. For example, the ATM 108 may display a screen like that shown in FIG. 7. It will be observed that the screen display of FIG. 7 includes option 702 (for selecting $25.00 as the amount of the top up), option 704 (for selecting $50.00 as the amount of the top up) and option 706 (for selecting $100.00 as the amount of the top up). (In alternative embodiments, the number of options and/or the amounts available for selection and/or the currencies may be different from those shown in FIG. 7.) It will also be noted that the screen display of FIG. 7 includes a legend 708 to indicate to the user that he/she is to select one of the options in order to select a monetary amount for the current top up transaction.

Following block 430 (FIG. 4B), and assuming that the user selects the top up amount, the process advances to block 436. At block 436, the ATM 108 sends another request to the mobile top up service provider computer 112. This second request indicates to the mobile top up service provider computer 112 the details (name of mobile carrier and mobile telephone number) for the top up transaction, as selected by the user, and also indicates the amount for the transaction, as selected by the user.

Following block 436, the process advances to decision block 438. At decision block 438, the ATM 108 determines whether it has received back from the mobile top up service provider computer 112 a message confirming that the mobile top up transaction has been performed. Until this occurs, the process may idle at decision block 438, as indicated by branch 440 from decision block 438. However, once the ATM 108 has received the confirmation message from the mobile top up service provider computer 112, then the process may advance from decision block 438 to block 442. At block 442, the ATM 108 may display to the user a screen display (not shown) to confirm to the user that the top up transaction has been completed. The process may then end (444).

Figure 8:
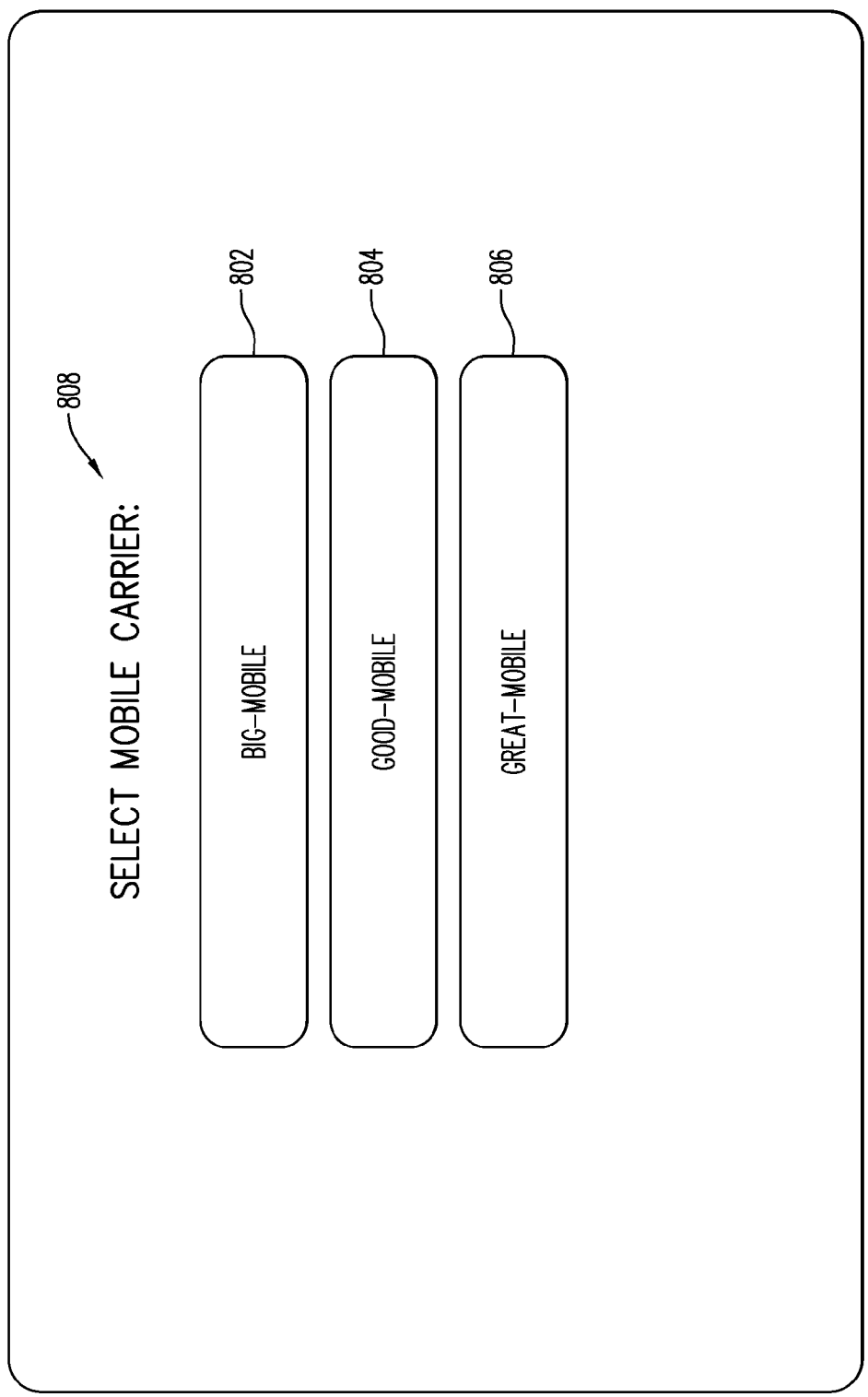

The discussion will now consider an alternative branch from decision blocks 422 and 428 (FIG. 4B), and in doing so will describe an alternative way in which the user may input his/her selection of a mobile telephone account for topping up in the current transaction. In particular, if the ATM 108 determines at decision block 422 that it did not receive a positive response to the first request or at decision block 428 that the user has selected the option to enter new phone details (option 608 in FIG. 6), then the process advances from decision block 422 in FIG. 4B or from decision block 428 in FIG. 4B to block 448 in FIG. 4C. At block 448, the ATM 108 prompts the user to select the mobile carrier for the mobile telephone account that is to be topped up in the current transaction and waits for the user to make his/her selection. For example, the ATM 108 may display a screen like that shown in FIG. 8. The screen display of FIG. 8 includes options 802, 804, 806, each of which displays the name of a respective mobile carrier. (In alternative embodiments, the number of carrier options may be more or fewer than the three such options shown in FIG. 8.) Also shown in the screen display of FIG. 8 is a legend 808 which indicates to the user that he/she is to select the desired mobile carrier by selecting one of the options 802-806.

Figure 9:
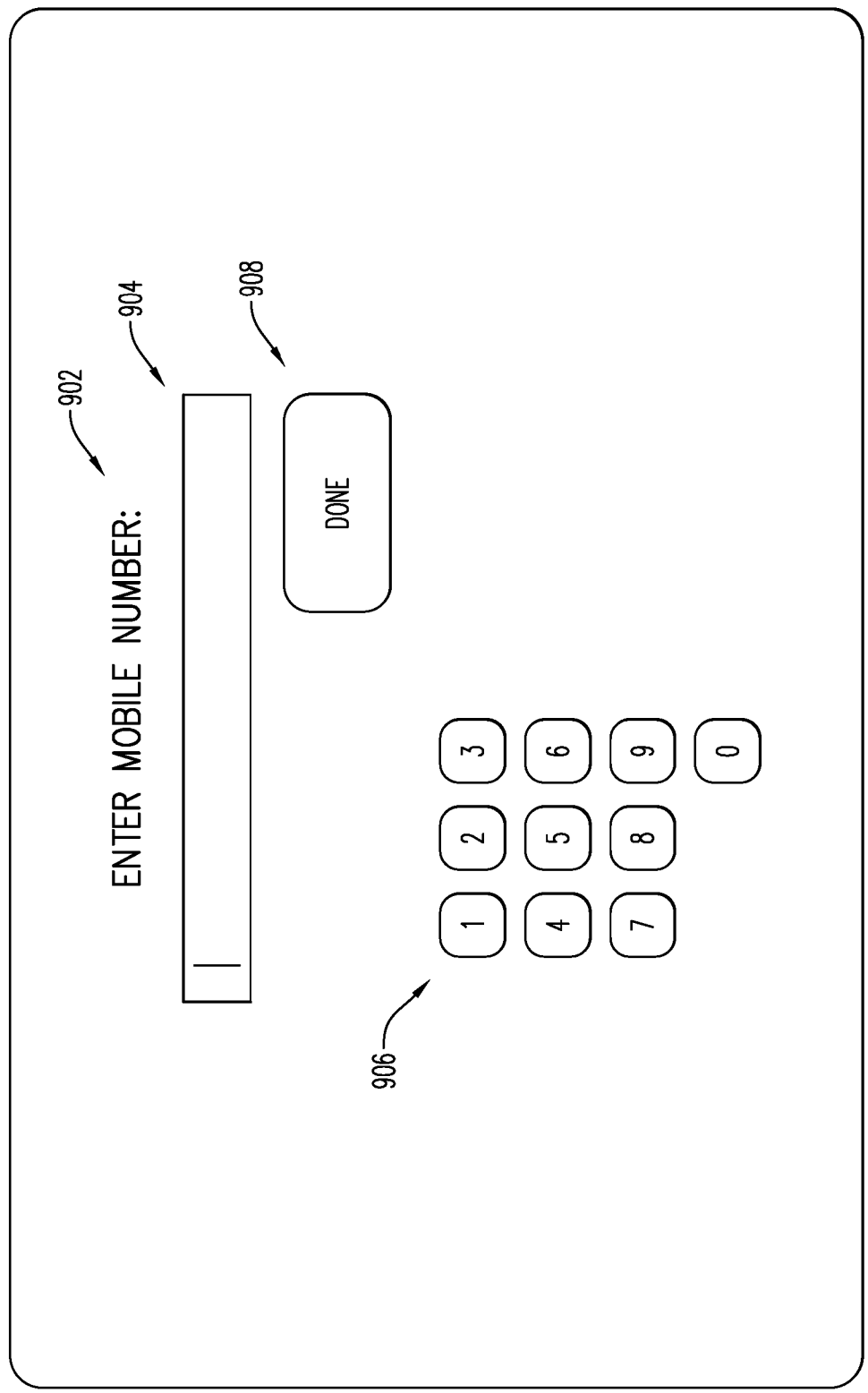

The process advances from block 448 to block 454. At block 454, the ATM 108 prompts the user to enter the mobile telephone number for the account that is to be topped up and waits for user input. For example, if the ATM 108 has a touch screen, then it may display a screen display like that shown in FIG. 9. This screen display includes a legend 902 instructing the user to enter the mobile telephone number and also includes a data entry field 904 into which the user is to enter the digits of the mobile telephone number. The user may enter the digits by interacting with a virtual numerical keypad displayed at 906, and may actuate a "done" button 908 when entry of the mobile telephone number is complete.

Figure 10:
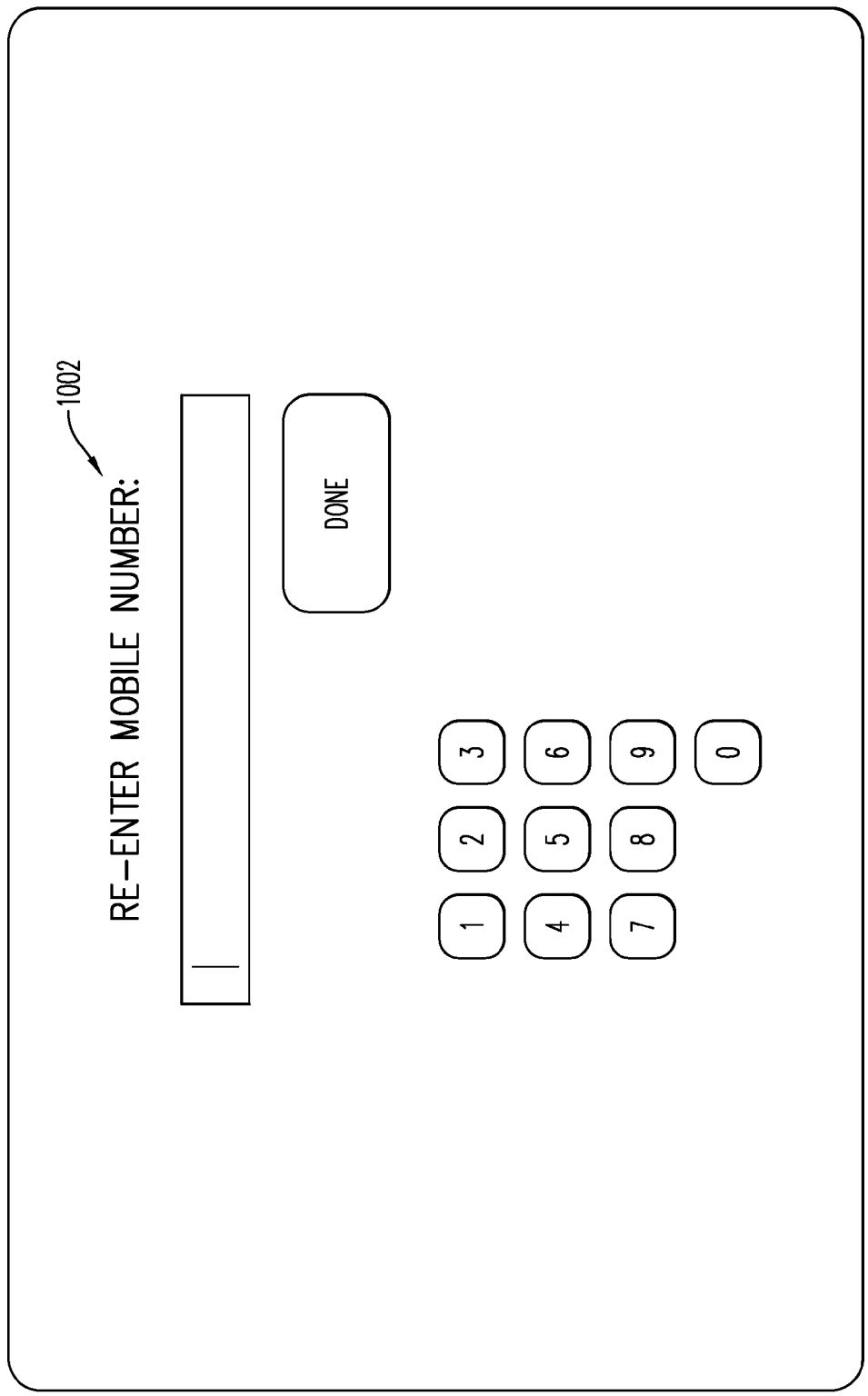

Referring again to FIG. 4C, the process advances from block 454 to block 460. At block 460 the ATM 108 prompts the user to re-enter the mobile telephone number in order to confirm that the user correctly entered the intended mobile telephone number in the first instance. If the ATM 108 has a touch screen, then this may be done by the ATM 108 displaying a screen display like that shown in FIG. 10. It will be noted that the screen display of FIG. 10 is the same as the screen display of FIG. 9, except for the legend 1002 in the screen display of FIG. 10 which prompts the user to re-enter the mobile telephone number.

Figure 11:
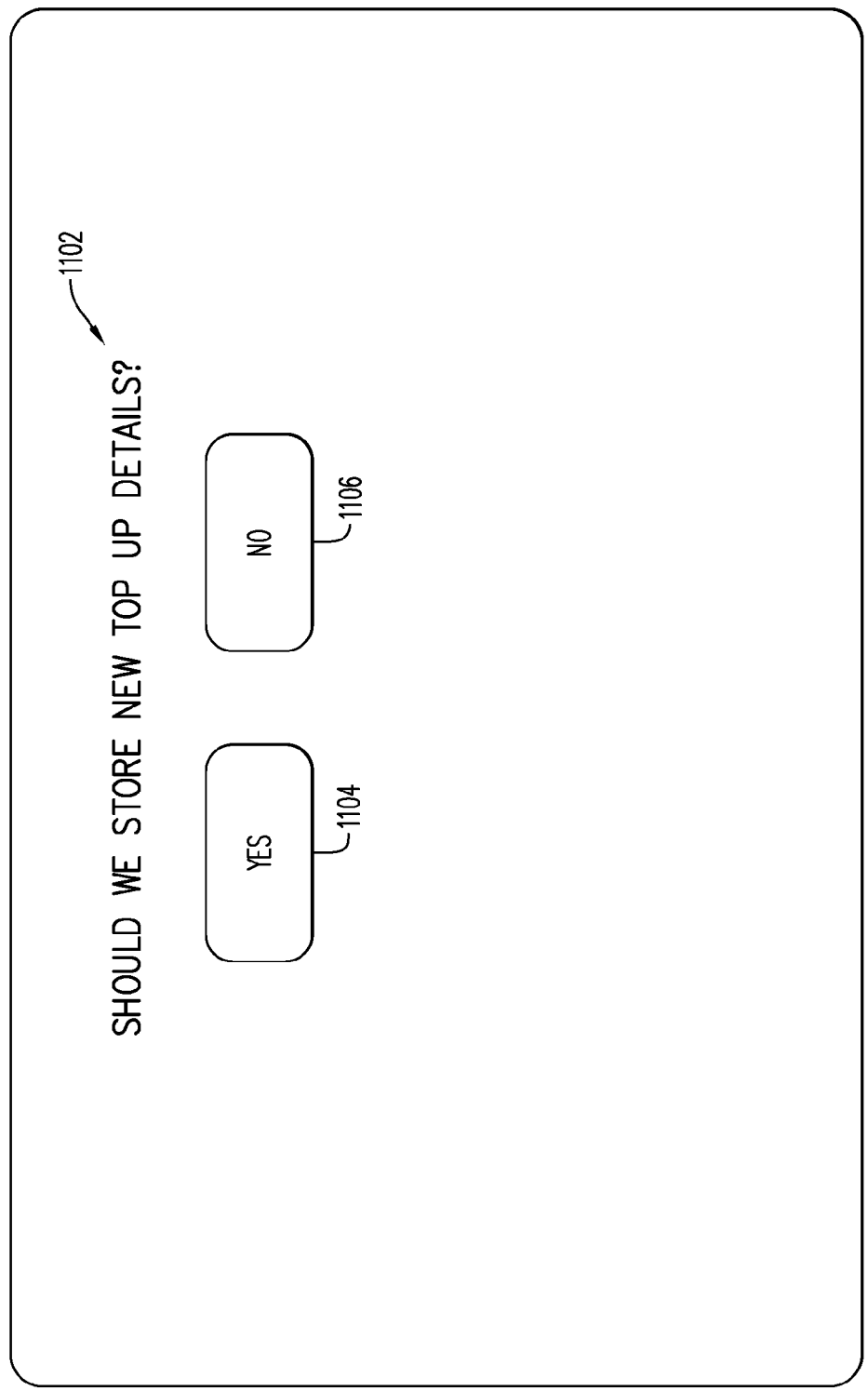

Referring again to FIG. 4C, the process advances from block 460 to decision block 462. At decision block 462, the ATM 108 determines whether the mobile telephone number, as re-entered by the user, matches the mobile telephone number as originally entered in response to the prompt screen shown in FIG. 9 (step 454). If the mobile telephone number as re-entered matches the mobile telephone number originally entered, then the process advances from decision block 462 to block 464. At block 464, the ATM 108 prompts the user to indicate whether the user wishes the system to store the mobile top up transaction details (carrier name and mobile telephone number)—which were entered at steps 448 and 454—for use in subsequent mobile top up transactions and waits for the user to input his/her choice. For example, if the ATM 108 has a touch screen, then it may display a screen display like that shown in FIG. 11. It will be noted that the screen display of FIG. 11 contains a query 1102 in which the user is asked whether the top up transaction details are to be stored. The screen display also includes response buttons 1104 and 1106. The user may indicate that he/she wishes the details to be stored by actuating "yes" button 1104 and may decline storage of the details by actuating "no" button 1106.

Once the user has input his/her choice, the ATM 108 may set a state of a mobile top up details storage indicator accordingly. In some embodiments, the mobile top up details storage indicator may have three states, including: (a) a first state that indicates that new details have been entered for the transaction and that the user desires that the new details be stored in the system; (b) a second state that indicates that new details have been entered for the transaction and that the user desires that the new details not be stored in the system; and (c) a third state that indicates that the user has selected the transaction details from previously stored details (as per steps 448-450).

Upon receipt of the store/don't store indication prompted for at step 464, the process may advance from block 464 to block 430 (FIG. 4B) at which the ATM 108 prompts for selection of a monetary amount for the transaction, as previously described. The process continues through to step 436 at which the ATM 108 sends the second request to the mobile top up service provider computer 112, as previously described. It is pertinent to note at this point that the second request sent by the ATM 108 to the mobile top up service provider computer 112 may include the mobile top up details storage indicator as described in the previous paragraph, in order to indicate to the mobile top up service provider computer 112 whether the transaction is utilizing previously stored details or new details, and if the latter, whether the mobile top up service provider computer 112 is to store the new details.

Considering again decision block 462 (FIG. 4C), if the ATM 108 determines that the re-entered mobile telephone number is not correct, the process may loop back to block 454 to give the user another opportunity to enter, and then re-enter, the mobile telephone number. In this loop as well, there may be a time-out function in effect and/or the process may permit only a limited number of retries before terminating.

It should also be understood that the screen displays shown in FIGS. 5-11 are only somewhat schematic examples, and that in practical implementations of the invention the user input may be captured via input keys or other input channels that may differ from touch screens and the screen displays may include other features, such as additional navigation options, options to terminate the transaction or return to a previous screen, etc.

Figure 12A:
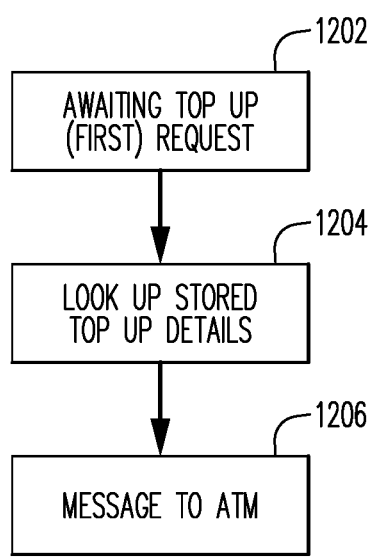
FIGS. 12A and 12B are flow charts that illustrate examples of top up transaction processes as performed in accordance with aspects of the present invention in the service provider computer of FIG. 3.
Figure 12B:
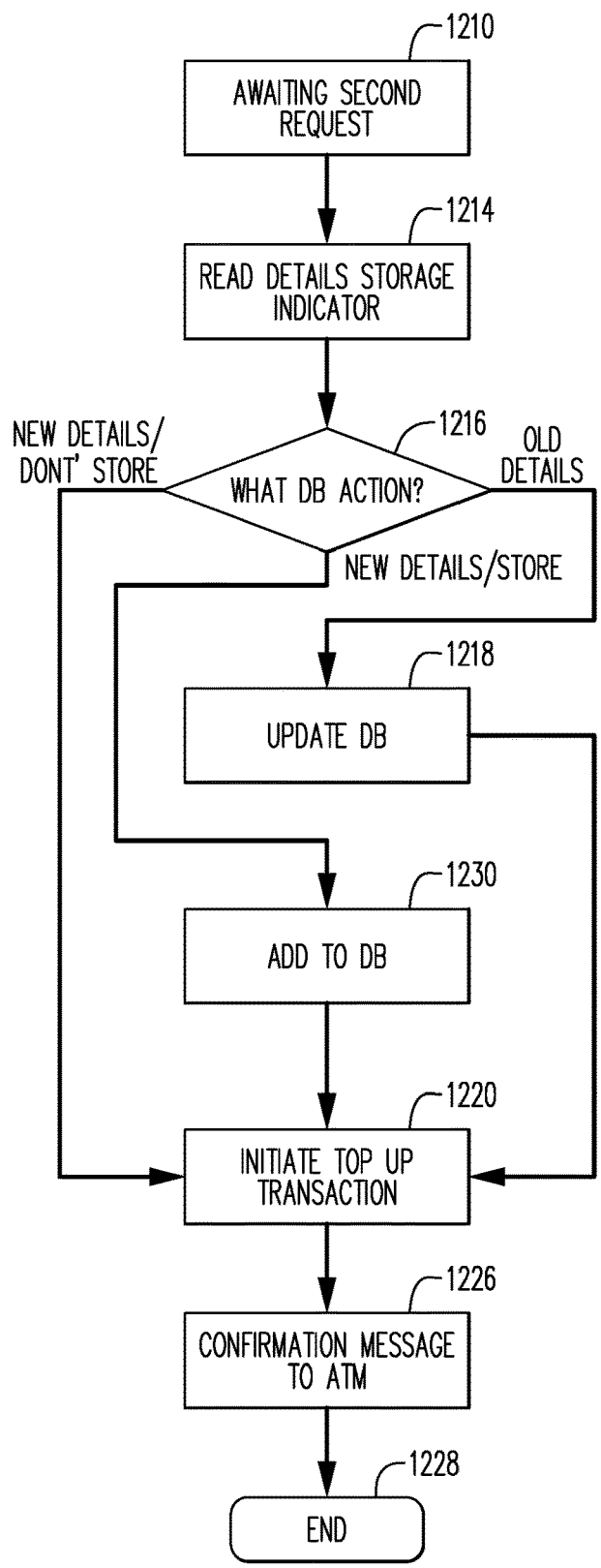

FIGS. 12A and 12B are flow charts that illustrate an example of top up transaction processes as performed in accordance with aspects of the present invention in the mobile top up service provider computer 112. FIG. 12A illustrates handling of the first request to service provider mentioned in block 420 in FIG. 4A. FIG. 12B illustrates handling of the second request to service provider mentioned in block 436 in FIG. 4B. The first and second requests to service provider will normally occur one after the other, but it should be noted that in some cases one may occur without the other.

At block 1202 in FIG. 12A, the mobile top up service provider computer 112 waits until it receives, from an ATM, a top up transaction (first) request of the kind described above in connection with block 420 in FIG. 4A. It will be recalled that a request of this type identifies the user by the user's payment card account number or ATM card number, and indicates that the user wishes to perform a mobile top up transaction, but does not include details for the requested transaction. Rather, the request calls on the mobile top up service provider computer 112 to download, to the ATM, details (mobile carrier and mobile telephone number) utilized by the user in prior top up transactions.

When a request for a top up transaction is received, the process of FIG. 12A advances from decision block 1202 to block 1206. At block 1206, the mobile top up service provider computer 112 uses the user's ATM/payment card account number (as contained in the request) to reference the top up details database 316 (FIG. 3) to look up details of previous top up transactions performed by the user. Assuming such details are found, the process of FIG. 12A advances from 1206 to 1208. At 1208, the mobile top up service provider computer 112 sends a message to the ATM in which the mobile top up service provider computer 112 downloads the prior transaction details. (In the absence of such details being on record with the mobile top up service provider computer 112, the mobile top up service provider computer 112 may send a negative response to the ATM, thereby requiring the user to enter new details.) After block 1208, the process of FIG. 12A ends.

The process of FIG. 12B starts with block 1210. At block 1210, the mobile top up service provider computer 112 waits until it receives a request from the ATM that specifies the transaction details (either selected by the user from stored details that were downloaded to the ATM from the mobile top up service provider computer 112 or newly entered details) and the amount of money selected for the top up. Once such a request is received, the mobile top up service provider computer advances to block 1214 and may read the above-mentioned mobile top up details storage indicator, which may be included in the request.

The process of FIG. 12B then advances from block 1214 to decision block 1216. At decision block 1216, the mobile top up service provider computer 112 determines what action to take with respect to the top up details database 316 in view of the state of the mobile top up details storage indicator as contained in the second request. If the state of the mobile top up details storage indicator was such as to indicate that the details in the second message were previously stored in the top up details database 316, then the process of FIG. 12 advances from decision block 1216 to block 1218. At block 1218, the mobile top up service provider computer 112 updates the top up details database 316 by overwriting, with the current date, the field in the database that indicates when the selected details were last used for a top up transaction.

The process of FIG. 12 then advances from block 1218 to block 1220. At block 1220, the mobile top up service provider computer 112 initiates a transaction in the payment system/ATM network 102 (FIG. 1) to credit the top up transaction amount to the mobile carrier indicated in the second request from the ATM. For example, the mobile top up service provider computer 112 may act on behalf of the acquirer for the indicated mobile carrier to initiate an essentially conventional purchase transaction in the payment system/ATM network 102. The purchase transaction may include the user's payment card account number such that the purchase transaction is routed in the payment system/ATM network 102 to the issuer 110 of the user's card to implement a charge (or debit) to the user's payment card account. Once the mobile top up service provider computer 112 receives an indication that the purchase transaction has been authorized by the issuer 110 of the user's card, then the mobile top up service provider computer 112 may send a message to the indicated mobile carrier to indicate that the carrier should credit the transaction amount to the user's mobile service air time account. This message may include the mobile telephone number selected by the user for the transaction details.

The process of FIG. 12B then advances from block 1220 to block 1226. At block 1226, the mobile top up service provider computer 112 sends a confirmation message to the ATM so that the ATM performs step 442 (FIG. 4B) to confirm to the user that the top up transaction is complete. The process of FIG. 12 then ends (1228).

Considering again decision block 1216, assume now that the mobile top up details storage indicator received in the second request was in a state to indicate that the user entered new details for the top up transaction and the user desires that the system store the new details. In this case, the process of FIG. 12B advances from decision block 1216 to block 1230. At block 1230, the mobile top up service provider computer 112 adds a new entry to the top up details database 316 for the user (ATM/payment card account number) in question to store the new top up transaction details along with the current date as the last date on which the new details were used for a top up transaction. The process of FIG. 12B then advances from block 1230 to blocks 1220, 1226, etc., as previously described.

Considering decision block 1216 once more, let it next be assumed that the mobile top up details storage indicator received in the second request was in a state to indicate that the user entered new details for the top up transaction but does not desire that the system store the new details. In this case, the process of FIG. 12 advances directly from decision block 1216 to blocks 1220, 1226, etc., without the mobile top up service provider computer 112 taking any action with respect to the top up details database 316. Consequently, in this case, the mobile top up service provider computer 112 does not store the new top up transaction details.

Figure 13:
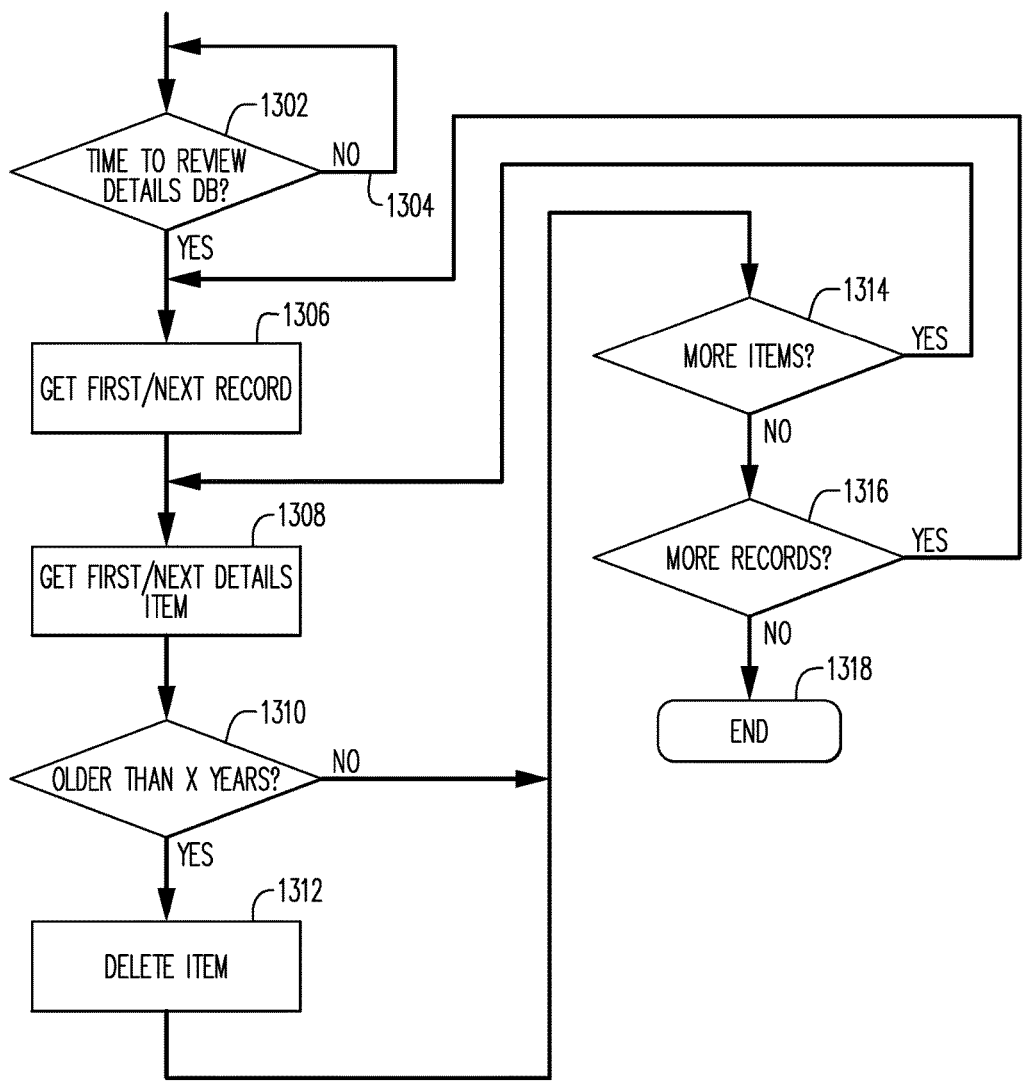
FIG. 13 is a flow chart that illustrates an example top up details database maintenance process as performed in accordance with aspects of the present invention in the service provider computer of FIG. 3.

FIG. 13 is a flow chart that illustrates an example process performed in accordance with aspects of the present invention by the mobile top up service provider computer 112 with respect to the top up details database 316. This process may, for example, be performed at regular intervals (e.g., weekly or monthly) by the mobile top up service provider computer 112 to prune obsolete information from the top up details database 316. Other similar processes (performed at regular intervals or after every transaction) may also be put in place, for example, to prune the older mobile top up records that have been stored for ATM/payment cards when the number of records exceeds a certain pre-defined number of records per card.

At decision block 1302 in FIG. 13, the mobile top up service provider computer 112 determines whether the time has arrived for performing the details database maintenance process. If not, the process idles, as indicated by branch 1304 from decision block 1304. However, if the appointed time for the maintenance process has arrived, then the process of FIG. 13 advances from decision block 1302 to block 1306. At block 1306, the mobile top up service provider computer 112 accesses the first or next record from the top up details database 316. Each record in the top up details database 316 corresponds to a given payment card account number for a user of the system.

The process of FIG. 13 advances from block 1306 to block 1308. At block 1308, the mobile top up service provider computer 112 accesses the first or next item in the current record. Each item in a record corresponds to a set of top up transaction details used by the corresponding user in a prior transaction and stored in the mobile top up service provider computer 112. Each item includes the latest date on which the set of details was used for a mobile top up transaction.

The process of FIG. 13 advances from block 1308 to decision block 1310. At decision block 1310 the mobile top up service provider computer 112 determines whether the latest use date for the item is more than a certain interval of time in the past. For example, an interval of five years may be used, so that items more than five years old are deleted. If the mobile top up service provider computer 112 makes a positive determination at decision block 1310, then the item in question is deleted (1312), and the process advances to decision block 1314 from 1312. At decision block 1314, the mobile top up service provider computer 112 determines whether there are any more items in the current record. If the mobile top up service provider computer 112 determines at decision block 1310 that the last use date of the details is not older than the certain interval of time, then the process of FIG. 13 advances from decision block 1310 directly to decision block 1314, without deleting the current item.

If the mobile top up service provider computer 112 determines at decision block 1314 that there are more items in the current record, the process of FIG. 13 loops back from decision block 1314 to block 1308 so as to access and examine the next item in the current record. Otherwise, the process of FIG. 13 advances from decision block 1314 to decision block 1316.

At decision block 1316, the mobile top up service provider computer 112 determines whether there are any more records in the top up details database 316. If so, the process of FIG. 13 loops back from decision block 1316 to block 1306 so as to access and examine the next record in the top up details database 316. Otherwise, the process of FIG. 13 is complete, and ends at 1318.

The present invention has been illustrated in the context of a transaction processing network that handles both ATM transactions and payment card transactions. However, other architectures or arrangements are also within the scope of the invention. For example, the ATM transaction network and the payment card system may be functionally separate, and the mobile top up service provider may be connected to both to provide the functionality described herein. For example, the mobile top up service provider may receive top up requests from ATMs via the ATM network, and may implement payments for the top ups via the payment card system. In some embodiments, for example, the mobile top up service provider may provide "on behalf" services to the mobile carriers, to submit payment card transactions to the acquiring institutions that service the mobile carriers. Upon receiving confirmation of authorization for the payment card system transactions, the mobile top up service provider may so inform the mobile carriers (while informing the carriers of the customers' mobile telephone numbers), which then credit the newly-purchased air time to the customers' mobile telephone accounts. Other arrangements and/or process flows are also possible, as will be recognized by those who are skilled in the art.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions and operated under the name of MasterCard, Visa, American Express, Diners Club, Discover Card or a similar system.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of operating an automatic teller machine (ATM) to perform a mobile telephone top up comprising:

reading, by a card reader operably connected to an automatic teller machine (ATM) processor, a card account number of a cardholder;

receiving, by the ATM processor via an input device, an indication from the cardholder to perform a mobile telephone top up transaction;

transmitting, by the ATM processor to a service provider computer, a request including the card account number for prior top up transaction data;

receiving, by the ATM processor from the service provider computer, the prior top up transaction data comprising at least one mobile telephone carrier and at least one mobile telephone number;

displaying, by the ATM processor on a display screen, the prior top up transaction data;

determining, by the ATM processor, that a predetermined amount of time expired without receiving a selection of a mobile telephone carrier and a mobile telephone number from the displayed prior top up transaction data;

displaying, by the ATM processor on the display screen, a plurality of mobile telephone carriers and an option to select one of the mobile telephone carriers;

receiving, by the ATM processor via the input device from the cardholder, a selection of one of the mobile telephone carriers;

displaying, by the ATM processor on the display screen, a prompt for the cardholder to enter a new mobile telephone number for the mobile telephone account to be topped up;

receiving, by the ATM processor via the input device, the new mobile telephone number;

prompting, by the ATM processor via the display screen, the cardholder to re-enter the new mobile telephone number;

prompting, by the ATM processor via the display screen, the cardholder to indicate whether to store the mobile top up transaction details when the re-entered new mobile telephone number matches the new mobile telephone number, and to indicate an amount of money to apply to the current top up transaction; and transmitting, by the ATM processor to the service provider, a second request comprising an amount of money indication and an instruction to store the transaction details when the cardholder provides the amount of money indication and responds positively to the prompt to store the mobile transaction details.

2. The method of claim 1, further comprising receiving, by the ATM processor from the service provider computer, a confirmation message indicating that the mobile telephone top up transaction has been completed.

3. The method of claim 1, further comprising displaying, by the ATM processor on the display screen, an indication that the current mobile telephone top up transaction has been completed.

4. An automatic teller machine (ATM) apparatus comprising:
an ATM processor;
a card reader operably connected to the ATM processor;
an input device operably connected to the ATM processor;
a display screen operably connected to the ATM processor; and
a storage device operably connected to the ATM processor and storing instructions configured to cause the ATM processor to:
receive a card account number via the card reader, the card account number associated with a cardholder;
receive an indication via an input device from the cardholder to perform a mobile telephone top up transaction;
transmit a request for prior top up transaction data associated with the cardholder to a service provider computer, the request for prior top up transaction data comprising the card account number;
receive the requested prior top up transaction data from the service provider computer, the prior pop up transaction data comprising at least one mobile telephone carrier and at least one mobile telephone number;
display the prior top up transaction data on the display screen;
determine that a predetermined amount of time expired without receiving a selection of a mobile telephone carrier and a mobile telephone number from the displayed prior top up transaction data;
display a plurality of mobile telephone carriers and an option to select one of the mobile telephone carriers on the display screen;
receive a selection of one of the mobile telephone carriers via the input device;
display a prompt on the display screen for the cardholder to enter a mobile telephone number for the mobile telephone account to be topped up;
receive the mobile telephone number via the input device;
prompt the cardholder via the display screen to re-enter the mobile telephone number for the mobile telephone account to be topped up;
prompt the cardholder via the display screen to indicate whether to store the mobile top up transaction details when the re-entered mobile telephone number matches the originally entered mobile telephone number, and to indicate an amount of money to apply to the current top up transaction; and
transmit a second request to the service provider comprising an amount of money indication and an instruction to store the transaction details when the cardholder provides the amount of money indication and responds positively to the prompt to store the mobile transaction details.

5. The apparatus of claim 4, wherein the storage device stores further instructions configured to cause the ATM processor to receive a confirmation message from the service provider computer indicating that the mobile telephone top up transaction has been completed.

6. The apparatus of claim 4, wherein the storage device stores further instructions configured to cause the ATM processor to display on the display screen an indication that the current mobile telephone top up transaction has been completed.

* * * * *